(No Model.) 2 Sheets—Sheet 2.
G. G. MATTHEWS.
PROTECTOR FOR HAY AND GRAIN STACKS.
No. 269,691. Patented Dec. 26, 1882.
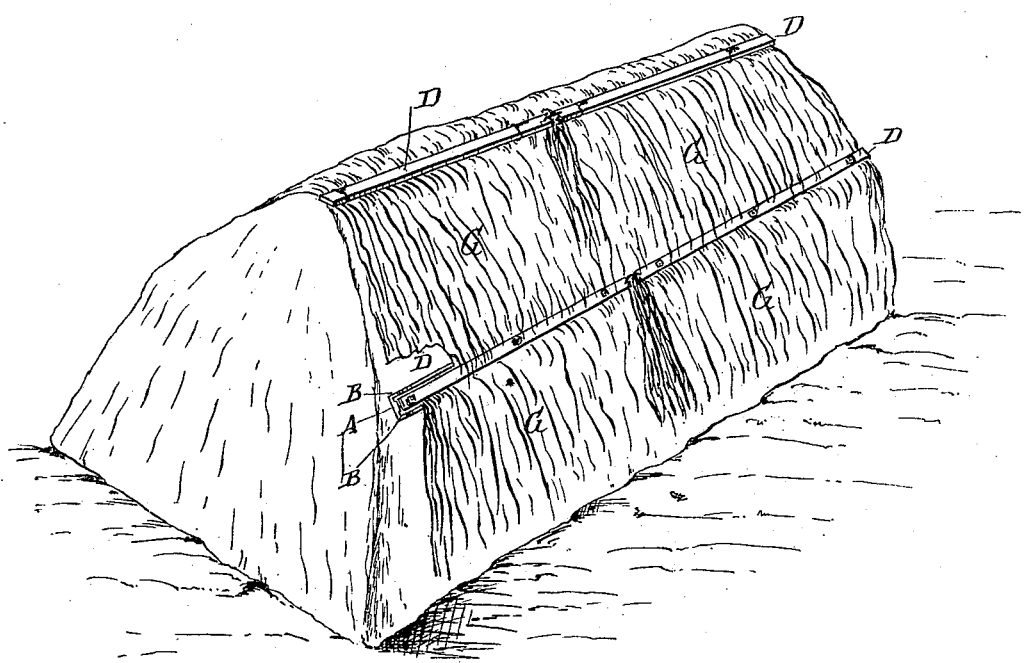
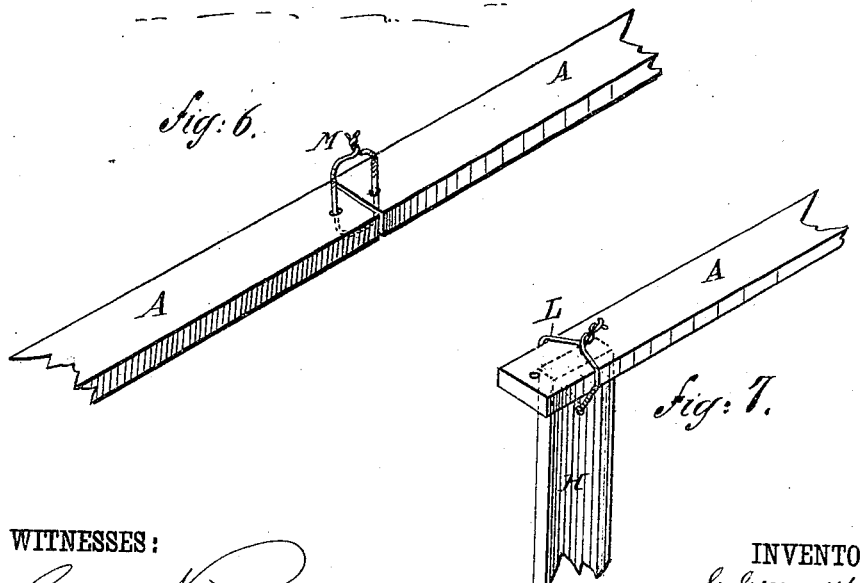
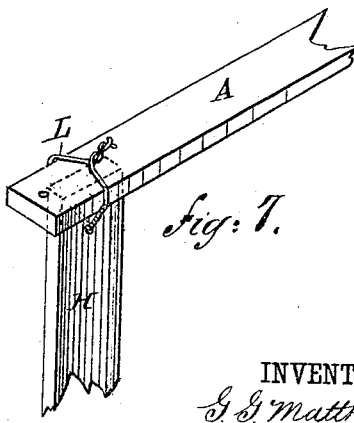
WITNESSES:
Chas. Nida
C. Sedgwick
INVENTOR:
G. G. Matthews
BY Munn & Co.
ATTORNEYS.

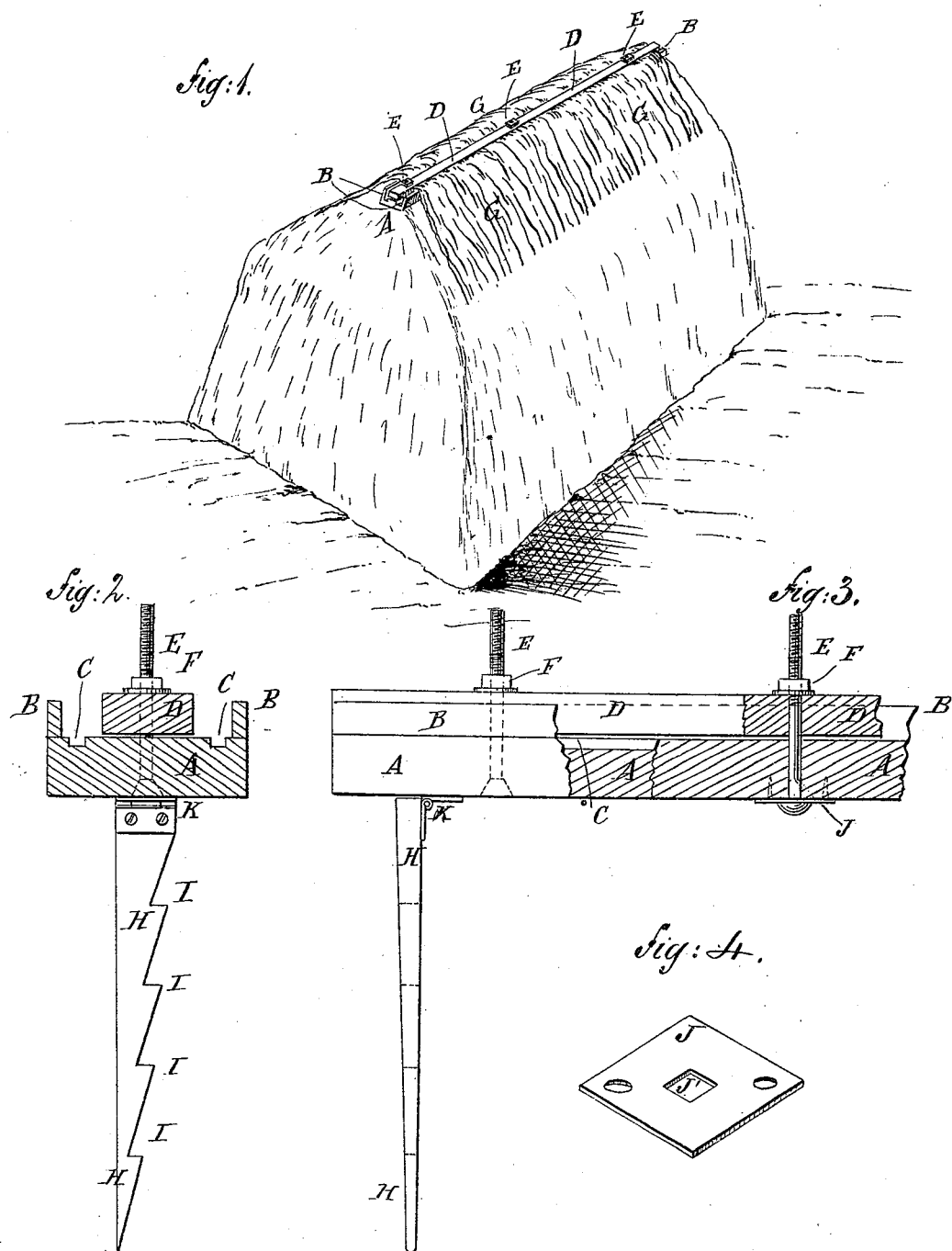

UNITED STATES PATENT OFFICE.

GEORGE G. MATTHEWS, OF WICHITA, KANSAS.

PROTECTOR FOR HAY AND GRAIN STACKS.

SPECIFICATION forming part of Letters Patent No. 269,691, dated December 26, 1882.

Application filed June 23, 1882. (No model.)

*To all whom it may concern:*

Be it known that I, GEORGE G. MATTHEWS, of Wichita, in the county of Sedgwick and State of Kansas, have invented a new and useful Improvement in Protectors for Hay and Grain Stacks, of which the following is a full, clear, and exact description.

Reference is to be had to the accompanying drawings, forming part of this specification, in which similar letters of reference indicate corresponding parts in all the figures.

Figure 1, Sheet 1, is a perspective view of my improvement, illustrating its use. Fig. 2, Sheet 1, is a sectional end elevation of the improvement. Fig. 3, Sheet 1, is a side elevation of a part of the same, parts being broken away. Fig. 4, Sheet 1, is a perspective view of a plate for holding the bolt from turning. Fig. 5, Sheet 2, is a perspective view of my improvement, illustrating a modification of its use. Fig. 6, Sheet 2, is a perspective view illustrating the mode of coupling the protectors. Fig. 7, Sheet 2, is a perspective view illustrating a mode of hinging the stakes to the protectors.

The object of this invention is to prevent the tops of hay and grain stacks from being blown off by the wind, and also to protect the tops of the said stacks from rain.

The invention consists in a protector for hay and grain stacks constructed with a board having longitudinal drain-grooves along the side parts of its upper surface, and having a narrow top board secured to it by bolts for clamping the overlapped ends of fibrous material. To the lower side of the base-board are hinged tapered stakes provided with shoulders or teeth for securing the protector firmly to the stack, as will be hereinafter fully described.

A represents a board about six inches wide, an inch (more or less) in thickness, and of convenient length, or of such a length as the length of the stack may require. Upon the upper surface of the board A, at a little distance from its side edges, are formed grooves C to drain off the water. Above the middle part of the board A is placed a board, D, about two inches wide and an inch (more or less) in thickness, which is connected with the said board A by bolts E and nuts F, the said bolts being placed about two feet apart. To the under side of the board A are attached small plates J, having square holes J' formed through them to receive the square shanks of the bolts E and hold the said bolts from turning while the nuts F are being screwed on and off.

In using the improvement the board D is detached, and layers of long grass, G, or other suitable fibrous material are arranged with their ends overlapped upon the upper side of the board A. The board D is then placed upon the overlapped ends of the grass G and drawn down by the nuts F, securely clamping the said grass between the said boards. The protector is then drawn endwise upon the top of the stack and the pins or stakes H are forced into the stack.

By this improvement the top of the stack will be firmly secured against being blown off by the wind, and at the same time will be protected from rain.

The stakes H are hinged to the lower side of the board A, so that they can be turned up against the said lower side for convenience in storage and transportation. The stakes H can be connected with the board A by hinges K, as shown in Figs. 2 and 3, or by wires L, passed through the said stakes and around the boards A D, as shown in Fig. 7. The stakes H are tapered, and teeth or shoulders I are formed in one or both edges to take hold of the grass or grain, and thus keep the protector in place upon the stack.

In the case of wide stacks a protector can be used at the top of the stack and one or more at each side, as illustrated in Fig. 5.

For additional security in holding the fibrous material, strips or cleats B can be attached to the upper sides of the side edges of the board A, as shown in Figs. 2 and 3, so that the top board, D, will bend as well as clamp the said fibrous material, and thus hold it more firmly. This construction should be used in the side protectors, and can be used or not in the top protector, as may be desired.

In case of large stacks, where more than one length of board A is required, the adjacent ends of the boards A are connected by wires M, passed through the said ends and twisted together around a bunch of fibrous material placed over the joint to protect the said joint from rain. This arrangement of wire is shown in Fig. 6.

Having thus described my invention, I claim as new and desire to secure by Letters Patent—

1. In a stack-protector, the combination, with the board A, of the tapered stakes H, hinged thereto, and provided with the shoulders I, substantially as described, and for the purpose set forth.

2. In a stack-protector, the combination, with the clamping-boards A D, bolts E, and the fibrous thatching material G, of the tapered stakes H, having shoulders I, and hinged to the board A, substantially as described, and for the purpose set forth.

3. In a stack-protector, the combination, with the board A, having grooves C, the top board, D, the fibrous thatching material G, and the bolts E, of the side strips, B, substantially as described, and for the purpose set forth.

GEORGE G. MATTHEWS.

Witnesses:
D. M. DALE,
H. W. DUNNING.